United States Patent [19]

Henson

[11] 4,363,495

[45] Dec. 14, 1982

[54] SLOPING-TERRAIN VEHICLE

[76] Inventor: Kenneth A. Henson, 1 Regency Ct., Dundas, N.S.W., 2117, Australia

[21] Appl. No.: 176,806

[22] Filed: Aug. 11, 1980

[30] Foreign Application Priority Data

Aug. 20, 1979 [AU] Australia .............................. PE0087

[51] Int. Cl.³ .............................................. B62B 13/16
[52] U.S. Cl. .................................. 280/12 H; 280/20;
280/818; 441/73
[58] Field of Search ............... 280/21 A, 21 R, 12 H, 280/16, 11.1 BT, 818, 87.04 A, 87.04 R, 23, 20; 9/310 C

[56] References Cited

U.S. PATENT DOCUMENTS

| | | | |
|---|---|---|---|
| 1,213,454 | 1/1917 | Brown | 280/87.04 A |
| 1,834,979 | 12/1931 | Skoglund | 280/12 H |
| 2,239,213 | 4/1941 | Artman | 280/23 |
| 2,260,027 | 10/1941 | Hotson | 280/11.1 ET |
| 2,318,147 | 5/1943 | Ericson | 280/12 H X |
| 2,609,210 | 9/1952 | Jennings | 280/21 A |
| 4,134,598 | 1/1979 | Urisaka | 280/11.1 BT X |

FOREIGN PATENT DOCUMENTS 1074921 4/1954 France .............................. 280/21 A

*Primary Examiner*—Joseph F. Peters, Jr.
*Assistant Examiner*—Milton L. Smith
*Attorney, Agent, or Firm*—Stevens, Davis, Miller & Mosher

[57] ABSTRACT

A sloping terrain recreational vehicle having a pair of ski-like terrain engaging elements with coupling means between them. The coupling means provides three limited degrees of freedom so that the elements can simulate skiing movements. The coupling means permits the skiis to be folded bottom-to-bottom for storage.

12 Claims, 16 Drawing Figures

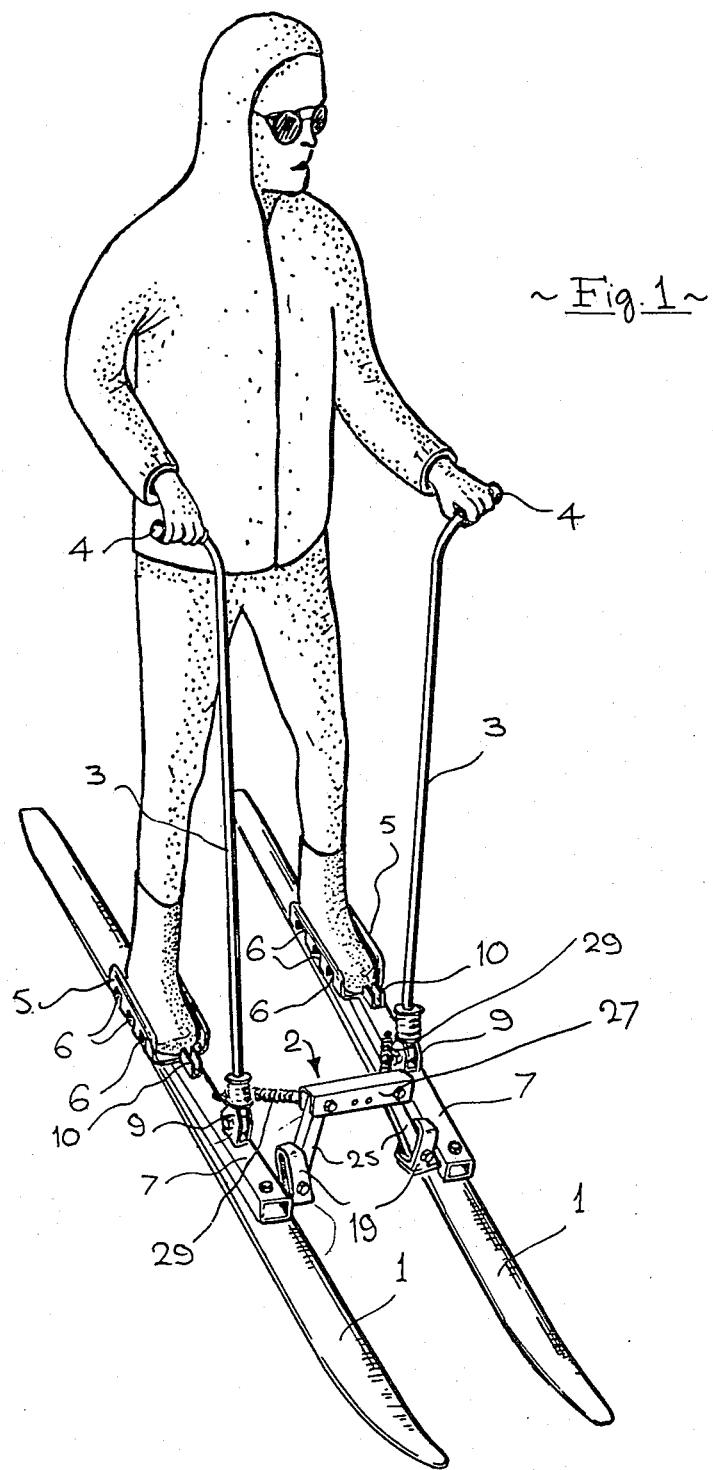
~Fig. 1~

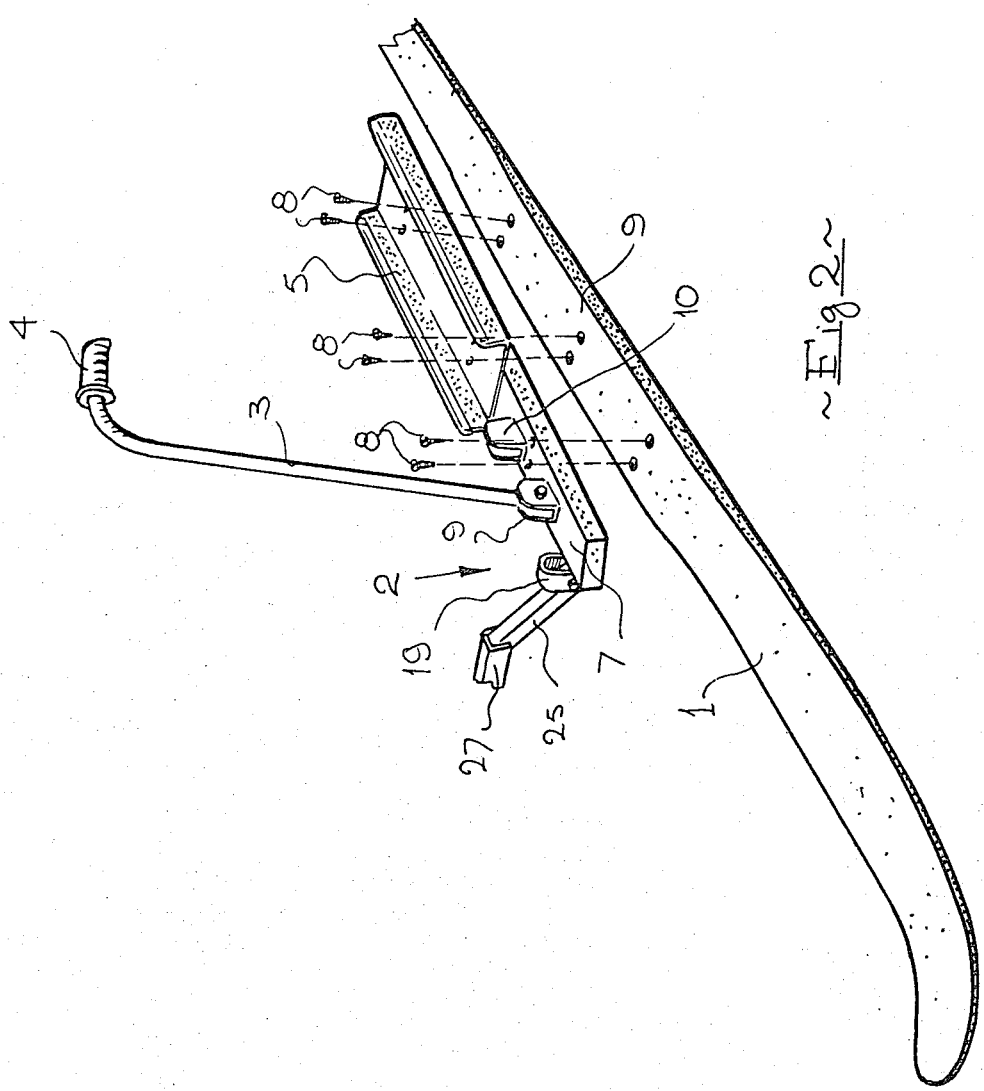

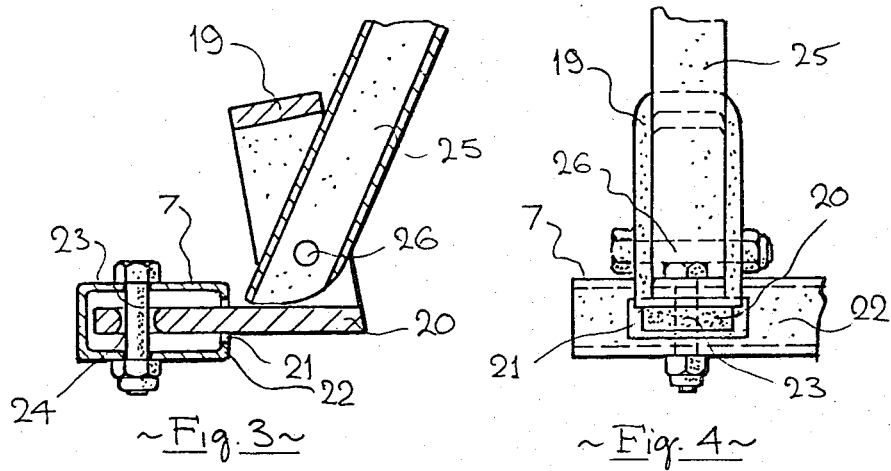
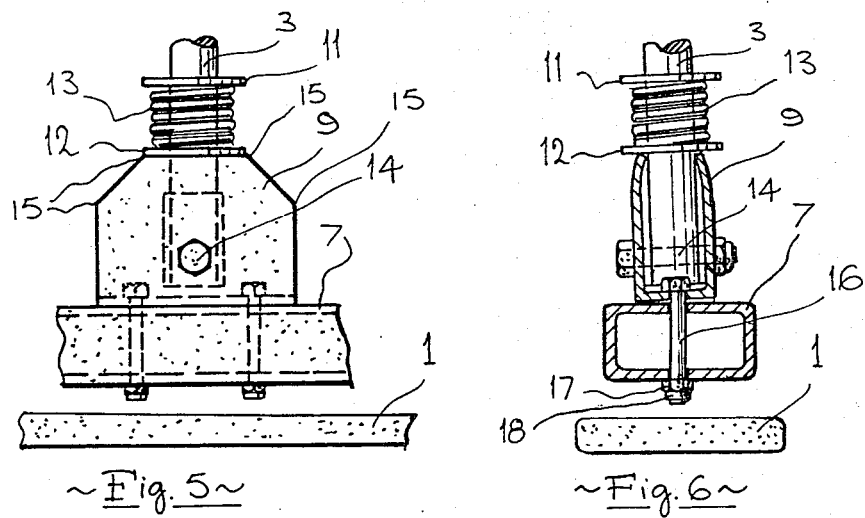
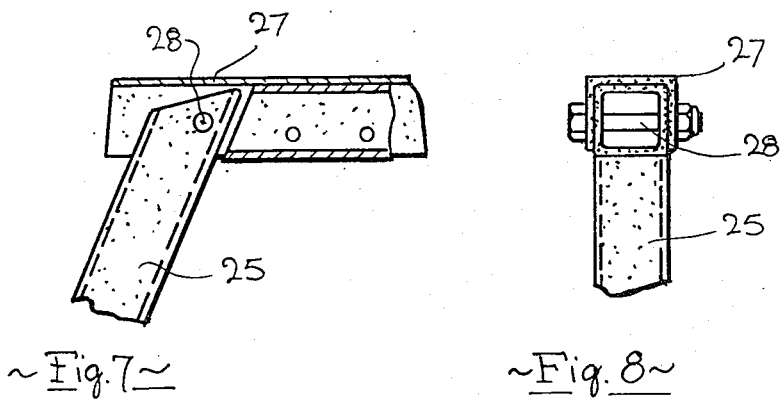

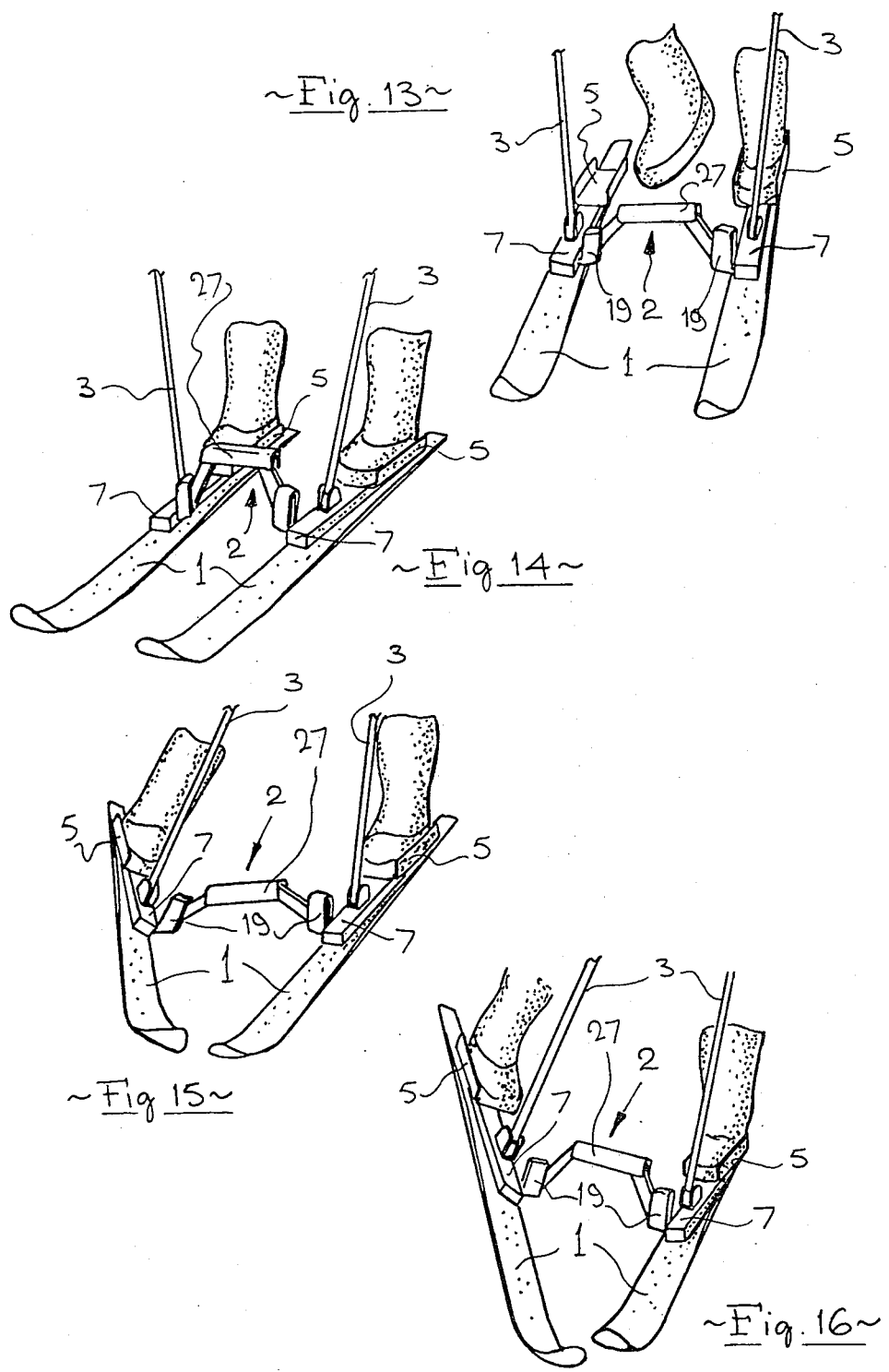

SLOPING-TERRAIN VEHICLE

This invention relates to sloping terrain vehicles, and more particularly to such vehicles having terrain-engaging elements somewhat in the nature of snow skis, grass skis, skateboards, roller-skates, childs' scooters and similar devices on which the rider stands to enjoy a 'downhill run' under the influence of gravity.

Hereinafter, the term 'terrain' is to be construed as referring to snow and grass, or their artificial equivalents, earth, bitumen surfaces, roadways and the like.

Terrain-engaging elements on which the rider stands can be hazardous to ride at speed, and falls may cause injury, and this is particularly the case where a novice is using snow skis, perhaps for the first time. Snow skis become an extension of a persons' body, being attached to the feet via ski boots, and injury—for example fracture of the bones of the legs—can easily occur when the ski boot bindings do not release, or other factors prevail, and forces are caused to be transmitted directly to the person's body.

It is therefore an object of the present invention to provide a sloping-terrain vehicle on which a rider may stand holding a handlebar in each hand and which allows the rider to control speed and direction but wherein the rider is not attached to the vehicle, whereby forces cannot be transmitted to the rider's body without the rider being able to avoid these forces by separating himself or herself from the said vehicle at any time.

Thus, according to the present invention, a sloping-terrain vehicle comprises a pair of terrain-engaging elements; flexible coupling means joining said pair of terrain-engaging elements in generally side-by-side relationship to thereby permit limited movement of said terrain-engaging elements with respect to each other; a handlebar extending upwardly from each terrain-engaging element; and a foot-locating member mounted upon the upper surface of each said terrain-engaging element.

Preferably, the flexible coupling means includes an elongated, hollow member rigidly attached to the upper surface of each terrain-engaging element parallel to the longitudial axis thereof; a pair of journal boxes each having a tongue extending from its lower side, this tongue being accommodatable within a said elongated, hollow member, adjacent its leading end, via an aperture formed in the inner wall of the elongated, hollow member; a pin extending through each elongated, hollow member and passing through a slot in a said tongue to thereby secure the tongue in the elongated, hollow member; a pair of linkage arms, the lower end of each of which is journalled in a said journal box for pivoting movement in a plane transverse to the longitudinal axes of the terrain-engaging elements; and a cross-member, to each end of which is pivoted an upper end of a said linkage arm; whereby each said tongue is permitted three limited degrees of freedom of movement with respect to its associated elongated, hollow member. The cross-member may have a pair of helical springs which extend between the cross-member and the elongated, hollow members.

Ideally, each of the foot-locating members is of U-shaped transverse cross-section and has apertured side-walls, each foot-locating member being attached to an associated elongated, hollow member at the end thereof remote from the flexible coupling means.

Ideally also, the lower end of each of the handlebars is pivoted in a clevis mounted upon an associated elongated, hollow member, for movement in a plane parallel to the before-mentioned longitudinal axes, to enable the handlebar to be 'laid flat' when the vehicle is not in use.

Advantageously, each handlebar is spring-biased to assume either an upright position or a 'laid flat' position.

In order that the reader may gain a better understanding of the present invention, hereinafter is described a preferred embodiment thereof, by way of example only and with reference to the accompanying drawings in which:

FIG. 1 is a general perspective view of a sloping-terrain vehicle according to the present invention, a rider being mounted thereon ready for travel;

FIG. 2 is an exploded perspective view of one half of the vehicle;

FIGS. 3 and 4 show the journal box, its tongue, and the lower end of a linkage arm;

FIGS. 5 and 6 show the lower end of a handlebar and the clevis wherein it is pivoted;

FIGS. 7 and 8 show the pivotal connection between the upper end of a linkage arm and the cross-member;

FIGS. 10 to 16 show various movements of which the flexible coupling means is capable.

Figure 9:
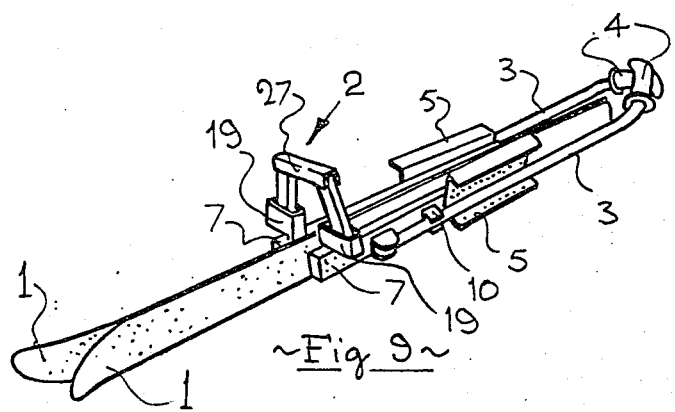
FIG. 9 illustrates how the vehicle of the present invention can be folded for transport and/or storage.

In FIGS. 1 and 2 is to be seen a sloping-terrain vehicle the terrain-engaging elements of which are constituted by a pair of conventional snow skis 1, although it will be noted that in FIG. 2 only half of the vehicle is shown for clarity, the other half being, needless to say, a mirror image of the half shown. Flexible coupling means, generally referenced 2, join skis 1 in side-by-side relationship, and a handlebar 3 extends upwardly from each ski 1. Handlebars 3 are bent outwardly at their upper ends, to provide a comfortable positioning for the rider's hands, and they are each furnished with a handgrip 4 which may well be of natural or synthetic rubber, or of some suitable plastic material. On the upper surface of each ski 1 is a foot-locating member 5, preferably of U-shaped transverse cross-section as shown, and which may have a series of apertures, such as 6, in its side-walls. The purpose of these apertures 6 is to let out any snow or water resulting from build-up of snow on the foot-locating members 5 and on the boots of the rider. In this regard, while any kind of ruggedly-constructed boot or shoe may be worn by the rider, ideally the kind of boot known as an 'apres' boot will be found particularly suitable.

Although in FIG. 1 there is depicted an adult figure using adult-sized skis, it should be realized that the sloping-terrain vehicle according to the present invention is particularly suited to children and to this end, child-sized skis may be incorporated.

Turning now specifically to FIG. 2, it will be seen that the flexible coupling means 2, handlebar 3 and foot-locating member 5 are all mounted upon an elongated, hollow member 7 which is rigidly attached, as by screws 8, to the upper surface of ski 1. Since the upper surface of a ski is not planar, having a raised 'midships' portion 9, the two ends of elongated, hollow member 7 will stand away from the upper surface of the ski—that is to say, they will 'stand proud' therefrom. As best to be seen in FIG. 1 and in FIGS. 5 and 6, to be later herein described in detail, each handlebar 3 is pivoted, at its lower end, in a clevis 9 mounted on elongated, hollow member 7, the arrangement being such that it is able to be folded down and laid flat for transport and storage—see FIG. 9 in this regard. When handlebars 3 are in the folded position, their shafts may be accommodated in suitable clips, such as 10, also mounted on the elongated, hollow members 7, which also form forward stops for the rider's boots when the vehicle is in use.

It may well now be convenient to have recourse to FIGS. 5 and 6 which show in greater detail how handlebars 3 may be pivoted in clevises 9. Washers 11 and 12 confine between them a compression spring 13, so that when handlebar 3 is moved about pivot pin 14 to thereby lay it flat parallel to the longitudinal axis of its associated ski 1, washer 12 is required to slide over the angles 15 of clevis 9. When this point is reached, spring 13 is compressed and an over-center action appertains so that handlebar 3 is biased to assume either the upright position or the folded, 'laid flat' position shown in FIG. 9. Clevises 9 are rigidly affixed to elongated, hollow members 7, and they may be angled as shown in FIG. 6 to allow the handle to be positioned conveniently for the rider.

Flexible coupling means 2 will now be described with reference to FIGS. 3, 4, 7 and 8 of the drawings in particular.

Flexible coupling means 2 includes a pair of journal boxes 19, each one of which having a tongue 20 extending from its lower side, these tongues 20 being accommodatable within a said elongated, hollow member 7, adjacent to its leading end, via an aperture or window 21 formed in the inner wall 22 of elongated, hollow member 7. A pin 23 extends through elongated, hollow member 7 and passes through a slot 24 in tongue 20 to thereby secure tongue 20 in member 7. Slot 24, shown in longitudinal section in FIG. 3, nevertheless extends transversely across tongue 20.

Thus it will be realized that tongue 20, captive within elongated, hollow member 7, via window 21, is permitted three limited degrees of freedom of movement with respect to its associated elongated, hollow member 7. That is to say, tongue 20 can pivot about pin 23 subject to the width of window 21 as compared with the width of tongue 20; tongue 20 can also move in a vertical plane concomitant with the vertical dimension of window 21 compared with the thickness of tongue 20 and the amount of movement permitted by reason of the slot 24 being able to slide up and down pin 23. Additionally, since the thickness of tongue 20 is considerably less than the internal height of elongated, hollow member 7 and somewhat less than the vertical dimension of window 21, a degree of twisting movement is possible for tongue 20. Thus, the said three limited degrees of movement are so permitted.

Journalled for pivotal movement in each journal box 19 there is a linkage arm 25, the lower end of which is depicted in FIGS. 3 and 4 and the upper end of which is shown in FIGS. 7 and 8. This lower end of each linkage arm 25 is able to pivot, in a plane transverse to the longitudinal axes of skis 1, about a pivot pin 26. The upper end of each linkage arm 25 is pivoted to an end of a cross-member 27, as shown in FIGS. 7 and 8, about a pivot pin 28.

Pivoted connections 19, 25, 26 and 25, 27, 28 may have a little 'play' to further the degree of flexibility of the coupling means 2.

Cross-member 27 may be of the order of 15 cm. in length and, as is to be seen in FIG. 1, may have a pair of helical springs 29 which extend between cross-member 27 and suitable anchor points on elongated, hollow members 7. In the interests of clarity, springs 29 are omitted from the other Figures of the drawings.

Advantageously, all the various component parts described above (with the exception, of course, of the skis) may be made from aluminum or aluminum alloy so that the vehicle is light in weight and easily transportable when folded as shown in FIG. 9. In this folded position the undersurfaces of the skis face each other to protect their plastic surfaces and/or steel edges from damage. Handles 3 fold down into clips 10 and foot-locating members 5, handgrips 4 overlapping each other neatly at the rear end. The vehicle may be held in this folded position by such means as straps etc. Cross-member 27 provides a convenient handle with which to lift and carry the folded vehicle. With conventional snow skis the sloping-terrain vehicle weighs approximately 7 kg.

Alternatively, the handles 3 may be folded forwards towards the tips if desired.

FIGS. 10 to 16 show the various movements of which flexible coupling means 2 is capable when the sloping-terrain vehicle is in use.

In the case of a vehicle designed for snow, a large number of the basic skiing movements may be thereby achieved. Thus, stemmed turns are performed by placing one or both skis at an angle to the direction of movement. The chief turning force is the shifting of weight from one ski to the other. The snowplow turn is made from a snowplow or double stem position by shifting the weight to one ski and exerting outward-turning pressure with the weighted foot to make a steered turn. The stem turn is made from traversing, with skis parallel, by stemming (or angling out) the upper ski and turning as in the snowplow. The stem Christiania is similar except that during the turn the skis are brought parallel and the rest of the turn is skidded with them in this position, while the Christiania is a swing from a slight intial stem that continues across the fall line. Sideslipping (which may be desirable on hard-packed snow) is possible with the skis skidded sideways by flattening them to disengage the edges and pushing the heels downhill and the skis out from under the body. Traversing is also possible by running downhill and diagonally across the fall line with skis parallel. For running downhill in the fall line, the skis are kept flat, parallel, close together, and equally weighted. The goal is a stable, relaxed position, slightly forward leaning (or voltage), with smooth movements to adjust the skier's center of gravity to changing conditions of snow and slope. The reverse position (or rucklage), with the body back and the weight on the heels, might be preferably in some circumstances. In this connection, it will be appreciated that the rider of the sloping-terrain vehicle stands somewhat further back upon the skis than does a skier using conventional skis, on account of the fact that downward force is partly applied by the arms via the handgrips.

Figure 10:
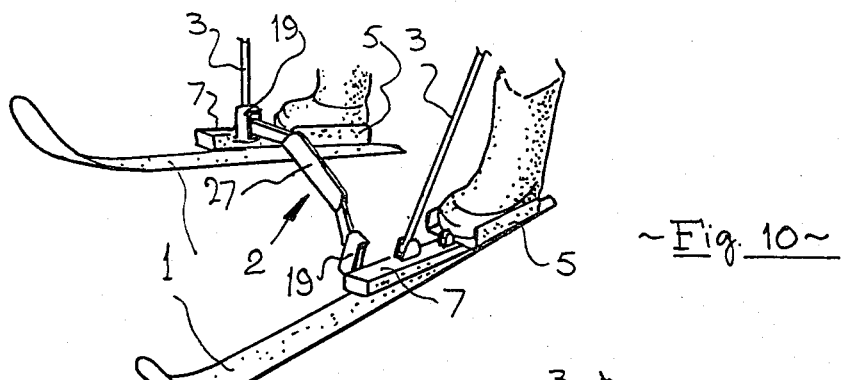
Figure 11:
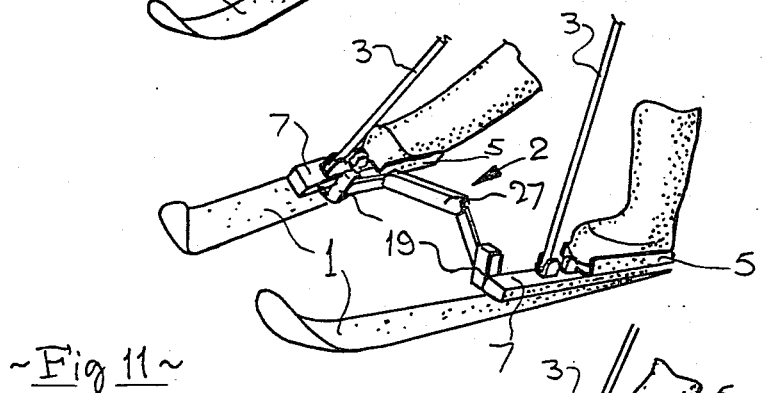
Figure 12:
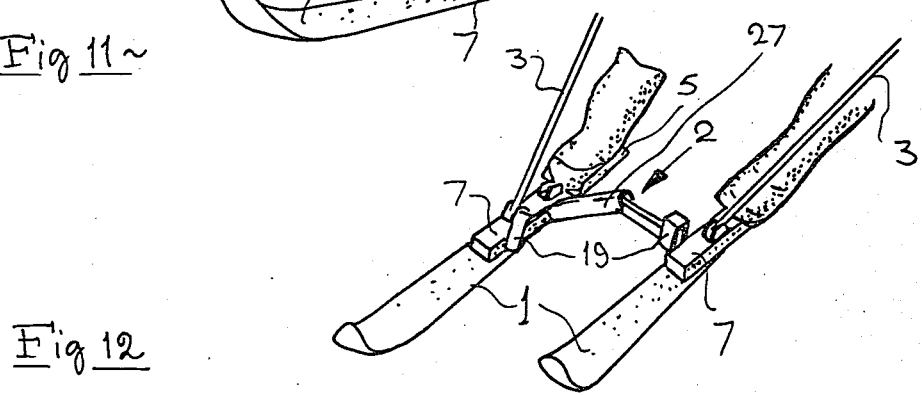

In particular, FIG. 10 illustrates a situation wherein the level of one ski can be up to 25 cm. above the level of the other, to enable the rider to negotiate humps and ridges in the snow and to be able to traverse across slopes of up to 45° or more with the level of one ski higher on the slope, FIG. 11 shows a turn in progress, the outside ski being 'edged' to provide traction in the turn, and this position can also cope with turns where the outside ski uses the camber of an embankment to assist with the turn maneuver, FIG. 12 shows both skis being 'edged' at the end of a turn maneuver, when an easy method of slowing down is to edge both skis as shown while slipping sidewards.

In FIG. 13 the skis are shown parallel and about 30 cms. apart to allow one foot to be placed between them in order to 'scoot' along flat areas or slightly uphill stretches. On very steep stretches the rider can step off, with both feet at one side or behind the vehicle, and propel it by walking alongside or behind and pushing, the handlebars being able to be angled rearwardly for this purpose, if desired. Alternatively, the vehicle may be connected to a tow, and pulled up a slope in known manner. Indeed, it may be towed on either flat or sloping terrain by a powered vehicle, or even by an animal, as in the sport known as skijoring.

In FIG. 14 the skis are parallel and about 18 cms. apart, which is a comfortable distance for straight downhill running. The distance between the skis can be varied at will by the rider within the range of 18 cms to 30 cms. As soon as a turn or other maneuver is commenced the flexible coupling means reacts to automatically increase the separation of the skis to aid balance and to allow sufficient clearance for the tips of the skis to approach each other and accommodate certain turn positions.

Finally, FIGS. 15 and 16 show the skis in position for a difficult sharp turn, with the skis approximately on the same level in the one instance and the tail of the outside ski in the turn at a higher point than the tail of the ski on the inside of the turn. When the skis are so angled with the tips together the two helical springs, between the cross-member and the respective skis, are stretched and therefore provide assistance to the rider in returning the skis to the parallel position rapidly and without strain.

As will be realized from the above, the flexible coupling means allows rotation of each ski about the vertical axis of the coupling of up to about 45° from a parallel position of the skis and each at 90° to the cross-member, with the left ski rotating clockwise and the right ski rotating anti-clockwise. The coupling also permits a degree of rotation of each ski on its longitudinal axis, carried out by lateral or medial movement of the separate handlebars and further allows a degree of movement when one ski rests on a higher or lower surface than does the other. The foot-locating member allows the rider to position a foot on each ski with the tip of the toe of a boot approximately on the center line of each ski.

Thus, the rider may select the position of the skis within the range of movement described so that when running straight the skis tend to assume a parallel position, but the tails of the skis cannot approach each other closer than approximately the distance of their separation at the coupling.

When slowing, the skis can be rotated so that they are 'plowed' with their inner edges lower than the outer edges; when turning right the right ski will remain flat while the left one is rotated to point to the right and rotated on its long axis to raise the outer edge; and when turning to the left in an opposite procedure is adopted.

While the above two paragraphs describe equally well the positioning of skis in one mode of conventional skiing, in the present invention the handlebars held in the rider's hands are used to control the positioning of the edges of each ski and the rider's feet are not attached to the skis by such means as conventional ski bindings. Thus the rider is able to dismount to avoid forces transmitted to his body through the skis, while retaining the ability to contol direction and speed by the interaction between the surface being traversed and the positioning of the skis as described.

In tests of the sloping-terrain vehicle, leading to the present invention, adults or children of average physique and dexterity were able to learn to ski with it in a short time. Although the risk of injury is lessened, the thrill and sense of achievement is not absent, as a degree of skill and co-ordination is still required to make effective use of the invention.

The invention also provides for the skis to be removed from their elongated, hollow members so that they may be used conventionally. Moreover the inventive sloping-terrain vehicle is less costly than an equivalent outfit of skis, ski-boots, bindings and ski-poles.

While the above description is couched in terms of the terrain-engaging elements being constituted by snow skis, they may equally well be grass skis, skateboards, roller skates or tandem-wheeled devices, in which cases modifications will be required to the flexible coupling means, handlebars and foot-locating members while still keeping within the spirit of the invention as defined in the appended claims.

From the above-going, the reader will appreciate that sloping-terrain vehicles constructed according to the present invention provide the public with a new or much-improved article or, at the very least, offer to it a useful and attractive choice.

Having defined the invention, I claim:

1. A sloping-terrain vehicle comprising a pair of terrain-engaging elements; flexible coupling means joining said pair of terrain-engaging elements in generally side-by-side relationship to thereby permit limited movement of said terrain-engaging elements with respect to each other; a handlebar extending upwardly from each terrain-engaging element; and a foot-locating member mounted upon the upper-surface of each said terrain-engaging element, said flexible coupling means including an elongated, hollow member rigidly attached to the upper surface of each terrain-engaging element parallel to the longitudinal axis thereof; a pair of journal boxes each having a tongue extending from its lower side, said tongue being accommodatable within a said elongated, hollow member, adjacent its leading end, via an aperture formed in the inner wall of said elongated, hollow member; a pin extending through each elongated, hollow member and passing through a slot in a said tongue to thereby secure said tongue in said elongated, hollow member; a pair of linkage arms, the lower end of each of which is journalled in a said journal box for pivoting movement in a plane transverse to the said longitudinal axes of said terrain-engaging elements; and a cross-member, to each end of which is pivoted an upper end of a said linkage arm; whereby each said tongue is permitted three limited degrees of freedom of movement with respect to its associated elongated, hollow member.

2. The sloping-terrain vehicle as claimed in claim 1, wherein said cross-member possesses a pair of helical springs extending between said cross-member and said elongated, hollow members.

3. The sloping-terrain vehicle as claimed in claim 1 or claim 2, wherein each said foot-locating member is of U-shaped transverse cross-section and has apertured side-walls, each said foot-locating member being rigidly attached to an associated elongated, hollow member at the end thereof remote from said flexible coupling means.

4. The sloping-terrain vehicle as claimed in claim 1, wherein the lower end of each said handlebar is pivoted on a clevis mounted upon an associated elongated, hollow member, for movement in a plane parallel to said longitudinal axes, to thereby enable said handlebars to be 'laid flat' when said vehicle is not in use.

5. The sloping-terrain vehicle as claimed in claim 4, wherein each said handlebar is spring-biased to assume either an upright position or a 'laid flat' position.

6. A sloping-terrain vehicle comprising a pair of terrain-engaging elements; a handlebar extending upwardly from each terrain-engaging element; a foot-locating member mounted upon the upper surface of each terrain-engaging element; and flexible coupling means disposed intermediate the ends of said terrain-engaging elements and joining them in generally side-by-side relationship to thereby permit limited movement of the said terrain-engaging elements with respect to each other; said flexible coupling means including an elongated member rigidly attached to the upper surface of each terrain-engaging element parallel to the longitudinal axis thereof, a pair of linkage arms, one end of each of which is coupled to a said elongated member, adjacent the leading end thereof, so as to permit three limited degrees of freedom of movement with respect to its associated elongated member, and a cross-member, to each end of which is pivoted the other end of a said linkage arm; the said flexible coupling means permitting the vehicle to be folded so as to juxtapose the under surfaces of the two terrain-engaging elements.

7. The sloping-terrain vehicle as claimed in claim 6, wherein each said elongated member is hollow; and wherein there is provided a pair of journal boxes each having a tongue extending from its lower side, said tongue being accommodatable within said elongated, hollow member via an aperture formed in its inner wall, and a pin extending through each elongated, hollow member and passing through a slot in a said tongue to thereby loosely secure said tongue in said member; said one end of each said linkage arm being journalled in a said journal box for pivoting movement in a plane transverse to the said longitudinal axes of said terrain-engaging elements.

8. The sloping-terrain vehicle as claimed in claim 6, wherein said cross-member possesses a pair of helical springs extending between said cross-member and said elongated members.

9. The sloping-terrain vehicle as claimed in claim 6, wherein each said foot-locating member is of U-shaped transverse cross-section and has apertured side-walls, each said foot-locating member being rigidly attached to an associated elongated member at the end thereof remote from said flexible coupling means.

10. The sloping-terrain vehicle as claimed in claim 6, wherein the lower end of each handlebar is pivoted in a clevis mounted in a plane parallel to said longitudinal axes, to thereby enable said handlebars to be 'laid flat' when the vehicle is not in use.

11. The sloping-terrain vehicle as claimed in claim 10, wherein each handlebar is spring-biased to assume either an upright position or said 'laid flat' position.

12. The sloping-terrain vehicle as claimed in claim 6, wherein the said terrain-engaging elements are snow skiis.

* * * * *